United States Patent [19]

Hickson et al.

[11] 4,269,949
[45] May 26, 1981

[54] PHENOL FORMALDEHYDE RESIN FOR HARDBOARD APPLICATIONS

[75] Inventors: Charles H. Hickson, New Albany Floyd, Ind.; Pitchaiya Chandramouli, Louisville, Ky.

[73] Assignee: Borden, Inc., Columbus, Ohio

[21] Appl. No.: 52,452

[22] Filed: Jun. 27, 1979

[51] Int. Cl.$^3$ ............................................. C08G 8/10
[52] U.S. Cl. ...................................... 525/58; 260/14; 260/17.2; 260/29.3; 428/526; 428/529; 525/405; 528/140; 528/142; 528/144; 528/147; 528/165
[58] Field of Search .................. 525/58, 405; 528/147, 528/140, 165, 144, 142

[56] References Cited

U.S. PATENT DOCUMENTS

| | | | |
|---|---|---|---|
| 2,138,795 | 11/1938 | Schmidt | 528/144 X |
| 2,608,536 | 8/1952 | Sterling | 525/58 X |
| 2,631,098 | 3/1953 | Redfern | 528/147 X |
| 2,748,101 | 5/1956 | Shappell | 528/147 X |
| 2,988,536 | 6/1961 | Hine et al. | 528/140 |
| 3,657,188 | 4/1972 | Perkins | 528/140 |
| 3,657,383 | 4/1972 | Silver | 525/405 |
| 3,839,251 | 10/1974 | Bornstein | 528/165 X |
| 4,098,770 | 7/1978 | Berchem et al. | 528/140 X |
| 4,140,845 | 2/1979 | Vasishth | 528/140 X |
| 4,176,106 | 11/1979 | Reid et al. | 528/140 X |

*Primary Examiner*—Howard E. Schain
*Attorney, Agent, or Firm*—George P. Maskas; Kenneth P. Van Wyck

[57] ABSTRACT

A finished resin comprising a highly condensed phenol formaldehyde resole resin which has green groups formed by a low condensation phenol formaldehyde resin, the finished resin being modified by addition of a weak acid and a non-cellulosic protective colloid to improve reactivity and flow properties thereof.

13 Claims, No Drawings

PHENOL FORMALDEHYDE RESIN FOR HARDBOARD APPLICATIONS

This invention relates to resole phenol formaldehyde resin compositions which are water-soluble and are prepared with alkali catalysis. These resin compositions are characterized by features associated with highly condensed resins as well as those of slightly condensed resins. Since these resin compositions exhibit controlled reactivity, sufficient flow with minimum dryout, excellent stringiness and controlled tack, they are especially suitable in hardboard manufacture as binders for wood fibers.

The resin of this invention is prepared in situ in a two-stage process which is characterized by reacting in the first stage under alkaline conditions at least 80% of the total phenol and formaldehyde that is used to prepare the resin. Preferably, at least 90% of total phenol and formaldehyde is reacted in the first stage. This stage of the reaction is carried out in order to obtain a highly condensed resin which has a water tolerance of about zero. Remainder of phenol and formaldehyde is added in the second stage and the reaction continued in order to obtain a low condensed resin which is characterized by infinite dilution or a water tolerance in excess of about 2000% and perferably about 2500%.

In order to obtain desired reactivity, a sufficient amount of an organic carboxylic acid is added to the resin in formulating the resin composition. For flow improvement, a non-cellulosic protective colloid is added in an effective amount.

The prior art resin compositions for applications such as hardboard production are illustrated by U.S. Pat. No. 3,180,784 to Meiler. These compositions are prepared by mixing two different resin systems: the first being a green or low condensed resin and the second, a highly condensed resin.

The resin compositions, such as those illustrated by the Meiler patent, suffer from many disadvantages. Thus, in the manufacture of such compositions, adequate storage facilities must be provided with mixing equipment for metering desired amounts of each resin. Even with sophisticated mixing equipment, reproducibility is difficult to achieve with mixed resin compositions and economic losses can ensue. Futhermore, and more importantly, such compositions lack adequate performance characteristics with respect to reactivity, controlled tack, and flow with stringiness.

Attempts at controlling reactivity without sacrificing resin compositions have been unsuccessful. Addition of strong mineral acids to the prior art resin compositions produces marginal improvement in reactivity, however, this also leads to gelation of the composition, which is undesirable. To prevent gelation, very dilute solutions of mineral acids can be used in large amount which, in turn, leads to the undesirable reduction in solids level in the resin composition and other problems. Aside from the disadvantages already discussed, such prior art resin compositions do not have the desired degree of flow, as evidenced by lack of stringiness.

Since certain properties of resins will be referred to herein, it is important to understand exactly what they mean. For this reason, a discussion thereof is presented hereinafter.

Resin reactivity is a measure of the cure characteristics of a resin. Thermosetting resins, such as the phenol formaldehyde resole resins, are highly heat sensitive and cure rapidly on exposure to heat. Consequently, it is imperative that the curing characteristics or the reactivity of the resin be controlled to achieve maximum reactivity at the desired temperature. When exposed to handling situations in environments of heat and catalysis, the resin will start to cure prematurely. This phenomenon called "precure", renders the resin unusable. Thus, when the resin-coated fiber furnish is exposed to hot air during the drying process to reduce furnish moisture, curing characteristics need be controlled to minimize resin precure and provide efficient curing at the desired time and temperature. As measured by the GE gel test, desired reactivity should be in the range of about a quarter hour and preferably, about 15 minutes, i.e., 13 to 17 minutes.

Flow is an important characteristic of any resin. To provide maximum resin efficiency, a resin must have good, but adequate flow. This is important both in the resin application stage as well as the curing stage. Too much flow is not desirable either. Caustic catalyzed resole resins have excellent flow in the presence of water. However, the resins upon drying, due to evaporation of water and/or another solvent or penetration of same when coated onto a porous substrate such as wood, lose their flow and become immobile. This phenomenon is called "resin dryout". The aspect of resin dryout is very important during the curing stages of the resin. In the absence of flow and with the onset of dryout, spot curing of resin occurs. This results in a non uniform contact of the resin and the substrate and leads to poor mechanical properties. An efficient resin system must have sufficient mobility or flow of resin during the curing stages. Stringiness is a measure of this flow during the curing stage and is measured by transferring a small sample of resin onto a hot plate maintained at 154° C. and spread into a thin film over 2"×2" area with a spatula. The resin is then constantly stroked to drive the moisture out. As the resin begins to cure, an increase in viscosity or a reduction in the fluidity of the resin will be observed. From this point, the spatula is constantly raised away from the hot plate surface and strings are observed during this motion. The observed extent of the strings and the length of time the strings can be maintained before the resin completely cures are cummulatively recorded as excellent, good, fair or poor strings. This test is an empirical method and relative comparisons can only be made.

Tack is yet another important attribute of a resin. During blending or resin application, resin to substrate adhesion is very important. However, during resin application onto fibers, the tack of the resin must be maintained at a minimum level to ensure little or no build up of resin coated fibers on the walls of the blender and conveyor lines. On the other hand, tack is a highly desirable property in mat consolidation and preparing before transferring the mat to a hot press for further pressing and curing. Thus, controlled tack is a highly desirable parameter of the resin and control of tack is an art in itself.

A suitable resin for hardboard manufacture must have controlled reactivity, sufficient flow with minimum dryout, at least good stringiness and controlled tack. The resin described herein is especially suitable for use in connection with the dry process for hardboard production although it is also suitable for use in connection with wet process and the combination process. In the dry process, the phenolic resin is applied to refined lignocellulosic fibers at a resin level of about 2%, based on the dry weight of the fiber. The resin is applied from a dilute solution. The fibers coated with resin are then dried to reduce moisture to the desired level, and laid into a mat. This mat is further processed and transferred to a hot press where it is cured at elevated temperature.

Preparation of our phenol formaldehyde resins will now be described in greater detail. Formaldehyde to phenol mole ratio in the finished resin should be in the range of 1.2 to 2.5, preferably from 1.5 to 2.2 In the first stage, the formaldehyde to phenol ratio should be in the range of 1.3 to 2.1 with about 0.2 to 3 mols of an alkaline catalyst, preferably 0.5 to 2 mols per mol of phenol. Examples of suitable alkaline catalysts are the alkali metal and alkaline earth hydroxides such as Sodium Hydroxide, Calcium Hydroxide, Potassium Hydroxide, Magnesium Hydroxide and Barium Hydroxide. Phenol and formaldehyde, in presence of an alkali, are reacted at conventional conditions to produce a highly or fully condensed resin, as measured by a water tolerance of essentially zero. Reaction temperature should be in the range of about 60° to 80° C. It should be understood that resins which are not fully condensed, would be suitable if they are highly or essentially fully condensed. The reaction is preferably cooled at this point, remainder of formaldehyde and/or phenol is added and the reaction is continued by allowing the mixture to exotherm to an elevated temperature. End point of the second stage is reached when water tolerance in excess of about 2000% preferably in excess of about 2500%, is reached to indicate low degree of condensation or a green resin. Water tolerance at this point will be essentially at infinite dilution.

To obtain the desired reactivity, an effective amount of a water-soluble weak acid can be used which has a $pK_a$ value of 0.7 to 8, preferably 3.5 to 5. The term $pK_a$ represents dissociation constant of the acid. In a preferred embodiment, an aliphatic carboxylic acid is added to the resin. Specific amount of such acid can vary between 0.5 to 10%, preferably 1 to 4% based on resin solids. Suitable aliphatic carboxylic acids include mono- and dicarboxylic acids, preferably lower alkyl carboxylic acids of about 1 to 5 carbon atoms. Examples of such acids are formic, acetic, propronic, pentanoic, oxalic, malonic, adipic, and mixtures of such acids. Formic acid is preferred. Addition of aromatic sulfonic acids, such as toluene sulfonic acid, or mineral acids, such as sulfuric, hydrochloric and phosphoric, did not provide the desired resin reactivity while maintaining water tolerance as well as storage stability.

For flow improvement, an effective amount of a non-cellulosic protective colloid is used, examples of which include polyvinyl alcohol and polyethylene oxide (polyox). On the basis of resin solids, recommended amount of a non-cellulosic protective colloid should be in the range of about 0.1 to 1%, preferably 0.05 to 0.5%. Partially hydrolyzed polyvinyl alcohol (Elvanol), used as a 10% solution, is preferred.

The invention is further demonstrated by the following examples which are set forth for purposes of illustration.

EXAMPLE 1

This example demonstrates separate preparation of a highly condensed resin and a green resin which were then mixed to form a blend thereof. This blend was found not suitable as a binder in hardboard production. Resin A was prepared in a conventional way by reacting 1 mol of phenol with 2 mols of formaldehyde with 0.1 mol of sodium hydroxide at reflux of 100° C. for a period of about 30 minutes to a viscosity end point of 350 cps, measured at 25° C. This was a highly condensed resin. Resin B, a green resin, was prepared by reacting 1 mol of phenol and 2 mols of formaldehyde with 0.1 mol of sodium hydroxide at 70° C. for about 35 minutes to a water tolerance end point of 2500% and viscosity of 35–50 cps, measured at 24° C. Then, a blend of the two resins was prepared by mixing 50 parts of resin A and 50 parts of resin B until a uniform mixture was obtained. Properties of the two resins and the blend thereof are given in Table 1 below:

TABLE 1

|  | Resin A | Resin B | Blend Of A & B |
|---|---|---|---|
| Non-volatile solids, % | 50 | 50 | 50 |
| Water tolerance, % | 0 | 2500 | 500 |
| GE Gel, time minutes | 6 | 14 | 8 |
| Stringiness | poor | none | poor |

When tested in hardboard manufacture, the blend of resins A and B did not have the desired reactivity, flow and cure properties.

The above experiments were repeated using a greater amount of sodium hydroxide, i.e., 0.6 mol per mol of phenol. Resin A had a GE/time of 4 minutes and water tolerance of about zero whereas resin B had a GE gel time of about 8–10 minutes and a water tolerance of 2000%. The 50—50 blend of Resins A and B resulted in a water tolerance in excess of 1000%, gel time of 6–7 minutes and poor strength.

EXAMPLE 2

This example demonstrates in situ preparation of our resins which have the dual functionallty of a high condensation resin and that of low condensation resin.

Resin C was prepared by reacting 0.39 mol of USP phenol, 0.17 mol of formaldehyde and 0.2 mol of sodium hydroxide at 70° C. for a period of 30 minutes, then cooled to 30°–35° C. Additional 0.4 mol of formaldehyde was added over a period of 30 minutes, allowing the mixture to exotherm to a temperature of 70° C. The reaction was maintained until water tolerance of about zero was reached. Cooling was immediately applied and additional 0.03 mol of phenol, and 0.06 mol of formaldehyde was added and the resin mixture was then cooled to 25° C. with agitation when water tolerance in excess of 2500% was reached. This resin had a formaldehyde to phenol ratio of 1.5.

Resin D was prepared by reacting 0.43 mol of phenol, 0.2 mol of formaldehyde and 0.8 mol of sodium hydroxide at 70° C. for 30 minutes and then cooled to 30°–35° C. An additional 0.7 mol of formaldehyde was added over a period of 30 minutes, allowing the reaction to exotherm to 70° C. This reaction was held at 70° C. until water tolerance of about zero was achieved. The mixture was then cooled, with additional 0.05 mol of phenol and 0.09 mol of formaldehyde being added during cooling with agitation. Cooling was continued until temperature of 25° C. was reached. Resin D had a formaldehyde to phenol ratio of 2.1. Properties of resins C and D are given in Table 2 below:

TABLE 2

|  | Resin C | Resin D |
|---|---|---|
| non-volatily solids, % | 50 | 50 |
| water tolerance, % | 2500 | 2500 |
| GE gel, minutes | 10 | 11 |

TABLE 2-continued

|  | Resin C | Resin D |
|---|---|---|
| stringiness | fair | fair |

It should be apparent from the above table that resins C and D did not have the desired reactivity nor stringiness.

EXAMPLE 3

This example illustrates the effect of a weak acid on reactivity of our resin.

Formic acid was added to resin C in amounts of 1.0%, 2.0%, and 6.0%, based on resin solids, with the following results in terms of gel time or reactivity and stringiness:

TABLE 3

| % formic acid | 1.0% | 2.0% | 6.0% |
|---|---|---|---|
| GE Gel, minutes | 11 | 12 | 16 |
| stringiness | fair | poor | poor |

To show that mineral acids are not suitable for purpose of improving resin reactivity, 2 to 4 drops of concentrated hydrochloric acid were added to Resin C. This resin precipitated immediately and showed signs of rapid localized gelling. Same result took place when 2 to 4 drops concentrated sulfuric acid were added to Resin C, with the polymer precipitating out, irreversibly. In order to achieve the desired reactivity, hydrochloric and sulfuric acids must be added in very dilute solutions. Mixtures prepared with very dilute solutions of such acids had non-volatile solids of about 15%, they are impractical and uneconomical.

EXAMPLE 4

Addition of cellulosic and non-cellulosic protective colloids to our resin composition is demonstrated in this example for improvement of resin stringiness.

A sample of the catalyzed resin composition of Example 3, containing 2% formic acid, was prepared. Several portions thereof were modified with various amounts of different thickeners based on resin solids. Composition and performance data for stringiness on our resin compositions so modified is presented in the table below:

TABLE 4

| type of thickener | 0.001% | 0.002% | 0.01% |  |  |
|---|---|---|---|---|---|
| cellulosic: |  |  |  |  |  |
| Methocel | poor | poor | poor |  |  |
| Natrosol | poor | poor | poor |  |  |
| non-cellulosic: | 0.05% | 0.1% | 0.2% | 0.4% | 0.5% |
| polyvinyl alcohol (Elvanol) | fair | good | excellent | good | good |

The celluosic thickeners were used in the form of a 0.5% aqueous solution, whereas the non-cellulosic thickener was used in the form of a 10% solution. Methocel is hydroxy propyl methyl cellulose whereas Natrosol is hydroxyethyl cellulose. The amounts of thickeners used, indicated in Table 4, are on the basis of 100% thickener. With respect to cellulosic thickeners, even the very small amounts thereof caused precipitation and of course, rendered the composition unsuitable for use.

The data in the above table demonstrates the positive effect of a non-cellulosic thickener on stringiness of our resin composition which was absent when cellulosic thickeners were used. The above resin composition, modified with 2% formic acid, and others conforming to our invention claimed herein, performed very well as binders in hardboard manufacture in terms of reactivity, flow with good stringiness, tack and strength. The hardboards were made in a known manner using conventional level of adhesive as well as conventional temperatures and pressures. For instance, amount of the binder can vary from about 1 to 10% of resin solids based on dry substrate material; commonly used conditions fall in the range of 140°-220° C. platen temperature, 50–800 psi and 2–20 minutes curing time. The method involves treating wood fibers with an aqueous binder solution in order to deposit an effective amount of the phenol foraldehyde resin composition, consolidating the resulting mass under pressure to a desired shape and exposing the mass to elevated temperature to cure the resin.

It is pointed out that hardboards are readily distinguishable from particleboards. Generally speaking, hardboards will have a density of about 70 to 80 lbs/ft$^3$ whereas density of particleboard will be in the range of about 35 to 65 lbs/ft$^3$.

The resins described herein contain functionalities of high and low condensation phenol formaldehyde resins. They are not an admixture of different resins but are homogeneous in the sense that they are prepared in situ by first forming the high condensation resin and then adding more phenol and/or formaldehyde to form low condensation resin which apparently manifests itself by attaching itself onto the molecules of the highly condensed resin to provide green groups thereon.

What is claimed:

1. Composition of matter comprising:
   A. A homogeneous phenol formaldehyde resole resin having a formaldehyde to phenol ratio of about 1.2 to 2.5 and a water tolerance in excess of 2000%;
   B. An alkaline catalyst;
   C. An effective amount of weak acid to give a resin reactively value of about a quarter of an hour; and;
   D. An effective amount of a non-cellulosic protective colloid to give a resin of improved flow properties including at least a good amount of stringiness; wherein the resin is prepared in a two stage process insitu by first reacting at least 80% of the total phenol and formaldehyde in the presence of the alkaline catalyst in a first stage to give a high molecular weight condensation resin of about zero water tolerance and then treating the resulting resin with additional phenol and formaldehyde in an amount up to 20% of the total phenol and formaldehyde in a second stage until a resin having a desired water tolerance in excess of about 2000% is obtained.

2. Composition of claim 1 wherein the formaldehyde to phenol ration is about 1.3 to 2.1 and the finished resin contains about 0.2 to 3 mols of the alkaline catalyst.

3. Composition of claim 2 wherein the finished resin has a formaldehyde ratio of 1.5 to 2.2.

4. Composition of claim 1 wherein the weak acid is selected from lower aliphatic carboxylic acids having dissociation constant (pK$_a$) of 0.7 to 8 which is used in an amount of 0.5 to 10%, based on resin solids, and the non-cellulosic protective colloid is used in amount of 0.01 to 1%, on the basis of resin solids.

5. Composition of claim 4 wherein the acid has a dissociation constant of 3.5 to 5 and is used in amount of 1 to 4% and the protective colloid is used in amount of 0.05 to 6. Composition of claim 5 which has a reactivity of about 15 minutes and good flow properties characterized at least in part by excellent stringiness wherein the alkaline catalyst is used in an amount of 0.5 to 2 mols per mol of phenol and is selected from alkali metal and alkaline earth hydroxides; the acid is selected from formic, acetic, propionic and oxalic acids; and the protective colloid is selected from polyvinyl alcohol and polyethylene oxide.

7. Composition of claim 6 wherein the acid is formic acid and the protective colloid is partially hydrolyzed polyvinyl alcohol.

8. Process of preparing a homogeneous phenol formaldehyde resolve resin composition having a formaldehyde to phenol ratio of 1.2 to 2.5 and having a water tolerance in excess of 2000% comprising the steps of:

A. Reacting at least 80% of the total phenol and formaldehyde in a first stage in a formaldehyde to phenol ratio of about 1.3 to 2.1 in the presence of about 0.2 to 3 mols of an alkaline catalyst per mol of phenol until a high condensation resin of almost zero water tolerance is obtained;

B. Reacting the resulting resin in a second stage with additional phenol and formaldehyde in an amount up to 20% of the total phenol and formaldehyde until a water tolerance of in excess of 2000% is reached;

C. Treating the resulting resin with an effective amount of a weak acid having a dissociation constant of about 0.7 to 8 to improve the resin composition reactivity of to a desired value of about a quarter of an hour; and D. Further treating the resin with an effective amount of a non-cellulosic protective colloid to improve flow properties and stability of the resin composition, including at least a good amount of stringiness.

9. Process of claim 8 wherein at least 90% of the total phenol and formaldehyde is reacted in the first stage at a formaldehyde to phenol ratio of about 1.5 to 2.2 in presence of 0.5 to 2 mols of an alkaline catalyst per mol of phenol at a temperature of about 60° to 80° C.

10. Process of claim 8 wherein the weak acid is selected from lower aliphatic carboxylic acids having dissociation constant ($pK_a$) of 3.5 to 5 which is used in an amount of 0.5 to 10%, based on resin solids, and the non-cellulosic protective colloid is used in amount of 0.01 to 1%, on the basis of resin solids.

11. Process of claim 10 wherein the acid has a dissociation constant of 3.5 to 5 and is used in amount of 1 to 4% and the protective colloid is used in amount of 0.05 to 0.5%.

12. Process of claim 11 wherein the resin composition has a reactivity of about 15 minutes and good flow properties characterized at least in part by excellent stringiness wherein the alkaline catalyst is used in an amount of 0.5 to 2.0 mols per mol of phenol and is selected from akali metal and alkaline earth hydroxides; the acid is selected from formic, acetic, propionic and oxalic acids; and the protective colloid is selected from polyvinyl alcohol and polyethylene oxide.

13. Process of claim 12 wherein the acid is formic acid and the protective colloid is partially hydrolyzed polyvinyl alcohol.

* * * * *